(12) United States Patent
Hayakawa

(10) Patent No.: US 10,846,884 B2
(45) Date of Patent: Nov. 24, 2020

(54) CAMERA CALIBRATION DEVICE

(71) Applicant: AISIN SEIKI KABUSHIKI KAISHA, Kariya (JP)

(72) Inventor: Kazutaka Hayakawa, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/561,255

(22) Filed: Sep. 5, 2019

(65) Prior Publication Data

US 2020/0082568 A1 Mar. 12, 2020

(30) Foreign Application Priority Data

Sep. 6, 2018 (JP) .................... 2018-167141

(51) Int. Cl.
| | |
|---|---|
| H04N 7/18 | (2006.01) |
| G06T 7/80 | (2017.01) |
| G06T 7/70 | (2017.01) |
| H04N 17/00 | (2006.01) |
| B60R 11/04 | (2006.01) |
| B60R 11/00 | (2006.01) |

(52) U.S. Cl.
CPC ............... *G06T 7/80* (2017.01); *B60R 11/04* (2013.01); *G06T 7/70* (2017.01); *H04N 17/002* (2013.01); *B60R 2011/0003* (2013.01); *B60R 2011/004* (2013.01); *G06T 2207/30244* (2013.01); *G06T 2207/30268* (2013.01)

(58) Field of Classification Search
CPC ...................................................... G06T 7/80
USPC ........................................................ 348/148
See application file for complete search history.

(56) References Cited

U.S. PATENT DOCUMENTS

| | | | | |
|---|---|---|---|---|
| 7,050,606 | B2* | 5/2006 | Paul ........................ | G06F 3/017 348/154 |
| 8,212,878 | B2 | 7/2012 | Shima et al. | |
| 9,233,645 | B2* | 1/2016 | Schofield ........... | G02B 27/0101 |
| 9,361,687 | B2* | 6/2016 | Shimoda .................. | G06T 7/80 |
| 9,485,474 | B2* | 11/2016 | Kim ........................ | G06F 3/005 |
| 9,794,552 | B1* | 10/2017 | Ribble ................. | H04N 17/002 |
| 10,282,860 | B2* | 5/2019 | Lu ........................... | G01S 17/86 |
| 10,358,086 | B2* | 7/2019 | Tanaka ............... | H04N 5/23293 |
| 2013/0222607 | A1* | 8/2013 | Oshima ............... | H04N 17/002 348/188 |

(Continued)

FOREIGN PATENT DOCUMENTS

| | | | |
|---|---|---|---|
| JP | 2004-001658 A | | 1/2004 |
| JP | 4820221 B2 | | 11/2011 |

*Primary Examiner* — Leron Beck
(74) *Attorney, Agent, or Firm* — Sughrue Mion, PLLC

(57) ABSTRACT

A camera calibration device includes: a storage unit configured to store an allowable range of a camera position posture including at least one of a position and an angle of an in-vehicle camera in association with a reference riding pattern that is a reference of an occupant's riding pattern with respect to a vehicle; an acquisition unit configured to acquire the riding pattern and the camera position posture at a preset timing; and a control unit configured to execute at least one of notification of optical axis deviation of the in-vehicle camera and correction of the optical axis deviation when the acquired camera position posture is not within the allowable range associated with the reference riding pattern that matches the acquired riding pattern in the storage unit.

4 Claims, 6 Drawing Sheets

(56) References Cited

U.S. PATENT DOCUMENTS

| | | | | |
|---|---|---|---|---|
| 2014/0168415 A1* | 6/2014 | Ihlenburg | ............ | H04N 5/2254 |
| | | | | 348/118 |
| 2016/0176344 A1* | 6/2016 | Wang | ................ | G06K 9/00791 |
| | | | | 348/36 |
| 2017/0061622 A1* | 3/2017 | Sakano | .............. | G06K 9/00744 |
| 2017/0327069 A1* | 11/2017 | Kim | .................. | G06K 9/00845 |
| 2018/0211123 A1* | 7/2018 | Yasuda | ................. | H04N 5/232 |

\* cited by examiner

FIG.5

| BASIC RIDING PATTERN | P1 | P2 | P3 | P4 | X-AXIS REFERENCE POSITION | X-AXIS TOLERANCE | Y-AXIS REFERENCE POSITION | Y-AXIS TOLERANCE | Z-AXIS REFERENCE POSITION | Z-AXIS TOLERANCE | X-AXIS REFERENCE ANGLE | X-AXIS ANGLE TOLERANCE | Y-AXIS REFERENCE ANGLE | Y-AXIS ANGLE TOLERANCE | Z-AXIS REFERENCE ANGLE | Z-AXIS ANGLE TOLERANCE |
|---|---|---|---|---|---|---|---|---|---|---|---|---|---|---|---|---|
| A | ○ | | | | 2mm | ±4mm | 1mm | ±2mm | 0mm | ±1mm | 0 DEGREE | ±1 DEGREE | 1 DEGREE | ±2 DEGREE | 0 DEGREE | ±1 DEGREE |
| B | ○ | | △ | | | | | | | | | | | | | |
| C | ○ | ○ | | | | | | | | | | | | | | |

US 10,846,884 B2

CAMERA CALIBRATION DEVICE

CROSS REFERENCE TO RELATED APPLICATIONS

This application is based on and claims priority under 35 U.S.C. § 119 to Japanese Patent Application 2018-167141, filed on Sep. 6, 2018, the entire contents of which are incorporated herein by reference.

TECHNICAL FIELD

Embodiments of this disclosure relate to a camera calibration device.

BACKGROUND DISCUSSION

There is disclosed a technology of calculating a camera position posture such as the installation height and the installation angle of a camera at the time of image capturing based on a feature such as a road surface marking included in a captured image obtained by capturing an image of a road surface using the camera mounted on a vehicle, and correcting the optical axis of the camera using the calculated camera position posture. See, for example, Japanese Patent No. 4820221 (Reference 1).

By the way, the camera position posture of the camera mounted on the vehicle may temporarily change due to a change in the number of occupants in the vehicle, a change in the position of the occupant in the vehicle, loading of baggage on the vehicle, and the like.

However, according to the above-described technology, such a change in the camera position posture due to a change in the number of occupants in the vehicle, a change in the position of the occupant in the vehicle, loading of baggage on the vehicle, and the like, may be erroneously detected as secular change in the optical axis of the camera, which may cause the optical axis of the camera to be corrected.

Thus, a need exists for a camera calibration device which is not susceptible to the drawback mentioned above.

SUMMARY

A camera calibration device according to an aspect of this disclosure includes, as an example, a storage unit configured to store an allowable range of a camera position posture including at least one of a position and an angle of an in-vehicle camera in association with a reference riding pattern that is a reference of an occupant's riding pattern with respect to a vehicle, an acquisition unit configured to acquire the riding pattern and the camera position posture at a preset timing, and a control unit configured to execute at least one of notification of optical axis deviation of the in-vehicle camera and correction of the optical axis deviation when the acquired camera position posture is not within the allowable range associated with the reference riding pattern that matches the acquired riding pattern in the storage unit.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a view illustrating an example of a camera position posture table stored in a storage unit of the vehicle according to the first embodiment;

DETAILED DESCRIPTION

Hereinafter, exemplary embodiments disclosed here will be disclosed. A configuration of the embodiments described below and actions, results, and effects caused by the configuration are given by way of example. The disclosure may be realized by a configuration other than the configuration disclosed in the following embodiments, and at least one of various effects based on a basic configuration and derivative effects may be obtained.

A vehicle equipped with a camera calibration device according to the present embodiment may be an automobile (internal combustion automobile) having an internal combustion engine (an engine) as a drive source, may be an automobile (an electric automobile, a fuel cell automobile, or the like) having an electric motor (motor) as a drive source, or may be an automobile (a hybrid automobile) having both the internal combustion engine and the electric motor as a drive source. Further, the vehicle may be equipped with any of various transmission devices and various other devices (systems, components, and the like) required for driving the internal combustion engine or the electric motor. Further, for example, the types, the number, and the layout of devices related to the driving of wheels in the vehicle may be set in various ways.

First Embodiment

Figure 1:
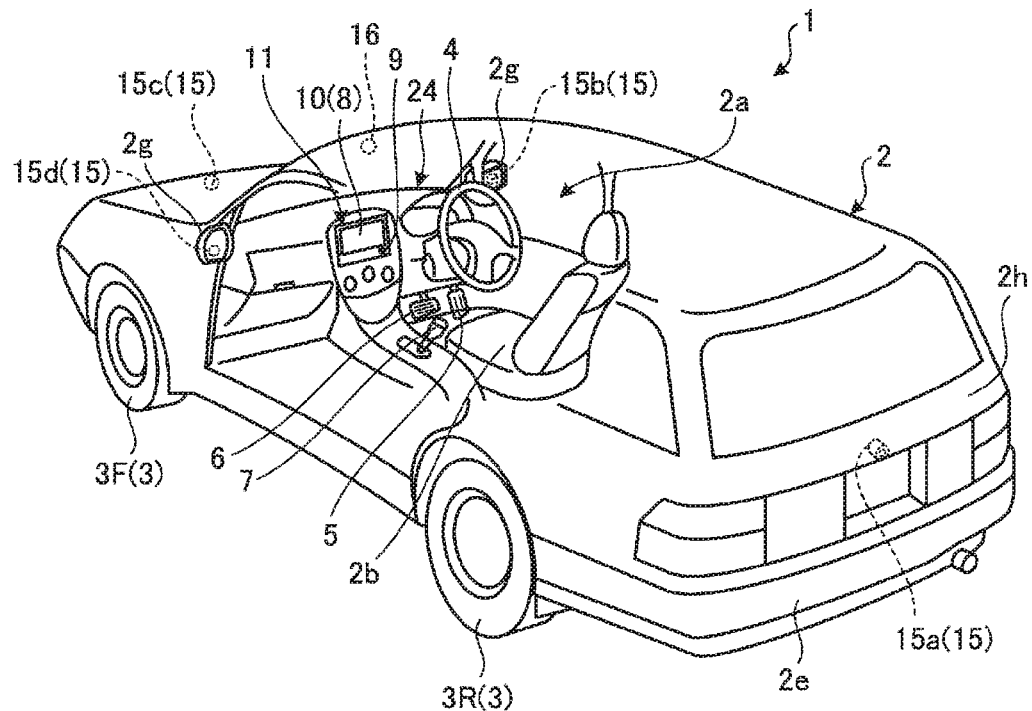
FIG. 1 is a perspective view illustrating an example of a state where a portion of a vehicle cabin in a vehicle equipped with a camera calibration device according to a first embodiment is seen through the vehicle.

FIG. 1 is a perspective view illustrating an example of a state where a portion of a vehicle cabin in a vehicle equipped with a camera calibration device according to a first embodiment is seen through the vehicle. As illustrated in FIG. 1, the vehicle 1 includes a vehicle body 2, a steering unit 4, an acceleration operation unit 5, a braking operation unit 6, a speed-change operation unit 7, and a monitor device 11. The vehicle body 2 has a vehicle cabin 2a on which an occupant gets. In the vehicle cabin 2a, the steering unit 4, the acceleration operation unit 5, the braking operation unit 6, the speed-change operation unit 7, and the like are provided in a state where a driver as the occupant faces a seat 2b. The steering unit 4 is, for example, a steering wheel that protrudes from a dashboard 24. The acceleration operation unit 5 is, for example, an accelerator pedal that is located under the driver's feet. The braking operation unit 6 is, for example, a brake pedal that is located under the driver's feet.

The speed-change operation unit 7 is, for example, a shift lever that protrudes from a center console.

The monitor device 11 is provided, for example, on the center portion of the dashboard 24 in the vehicle width direction (i.e., in the transverse direction). The monitor device 11 may have a function such as a navigation system or an audio system. The monitor device 11 includes a display device 8, a voice output device 9, and an operation input unit 10. Further, the monitor device 11 may have various operation input units such as a switch, a dial, a joystick, and a push button.

The display device 8 is constituted by a liquid crystal display (LCD) or organic electroluminescent display (OELD), and is capable of displaying various images based on image data. The voice output device 9 is constituted by a speaker and the like to output various types of voice based on voice data. The voice output device 9 may be provided at a different position other than the monitor device 11 in the vehicle cabin 2a.

The operation input unit 10 is constituted by a touch panel and the like, and enables an occupant to input various pieces of information. Further, the operation input unit 10 is provided on a display screen of the display device 8 and is capable of transmitting an image displayed on the display device 8. Thus, the operation input unit 10 enables the occupant to visually recognize the image displayed on the display screen of the display device 8. The operation input unit 10 receives an input of various pieces of information by the occupant by detecting a touch operation of the occupant on the display screen of the display device 8.

Figure 2:
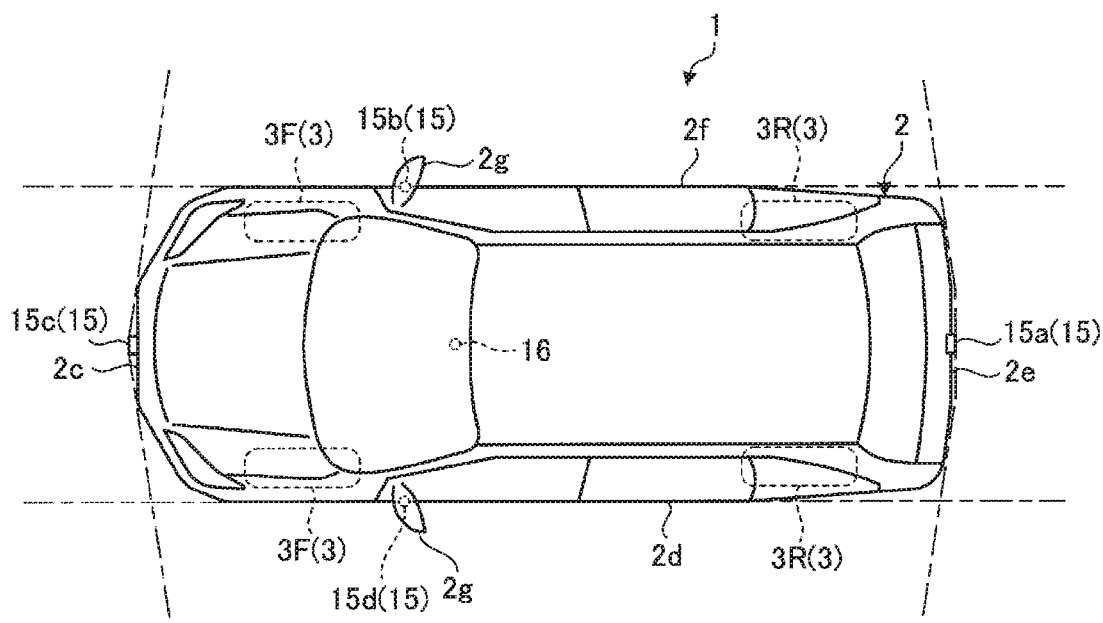
FIG. 2 is a plan view of an example of the vehicle according to the first embodiment.

FIG. 2 is a plan view of an example of the vehicle according to the first embodiment. As illustrated in FIGS. 1 and 2, the vehicle 1 is a four-wheel vehicle or the like, and has two left and right front wheels 3F and two left and right rear wheels 3R. All or some of the four wheels 3 are steerable.

The vehicle 1 is equipped with a plurality of imaging units 15 (in-vehicle cameras). In the present embodiment, the vehicle 1 is equipped with, for example, four imaging units 15a to 15d. The imaging unit 15 is a digital camera having an imaging element such as a charge coupled device (CCD) or a CMOS image sensor (CIS). The imaging unit 15 is capable of capturing an image of the periphery of the vehicle 1 at a predetermined frame rate. Then, the imaging unit 15 outputs a captured image obtained by capturing the image of the periphery of the vehicle 1. Each imaging unit 15 has a wide-angle lens or a fish-eye lens, and is capable of capturing an image of, for example, a range from 140° to 220° in the horizontal direction. Further, the optical axis of the imaging unit 15 may be set obliquely downward.

Specifically, the imaging unit 15a is located, for example, on an end 2e at the rear side of the vehicle body 2 and is provided on a wall portion below a rear window of a rear hatch door 2h. Then, the imaging unit 15a is capable of capturing an image of an area behind the vehicle 1 among the periphery of the vehicle 1. The imaging unit 15b is located, for example, on an end 2f at the right side of the vehicle body 2 and is provided on a door mirror 2g at the right side. Then, the imaging unit 15b is capable of capturing an image of an area at the lateral side of the vehicle 1 among the periphery of the vehicle 1. The imaging unit 15c is located, for example, on the front side of the vehicle body 2, i.e., on an end 2c at the front side in the longitudinal direction of the vehicle 1 and is provided on a front bumper or a front grille. Then, the imaging unit 15c is capable of capturing an image in front of the vehicle 1 among the periphery of the vehicle 1. The imaging unit 15d is located, for example, on the left side of the vehicle body 2, i.e., on an end 2d at the left side in the vehicle width direction and is provided on a door mirror 2g at the left side. Then, the imaging unit 15d is capable of capturing an image of an area at the lateral side of the vehicle 1 among the periphery of the vehicle 1.

Further, as illustrated in FIGS. 1 and 2, an in-cabin camera 16 is provided in the vehicle cabin 2a. The in-cabin camera 16 is a digital camera having an imaging element such as a CCD or CIS. Further, the in-cabin camera 16 is capable of capturing an image of the inside of the vehicle cabin 2a at a predetermined frame rate. The in-cabin camera 16 is provided to be able to capture an image of the occupant in the vehicle 1.

Figure 3:
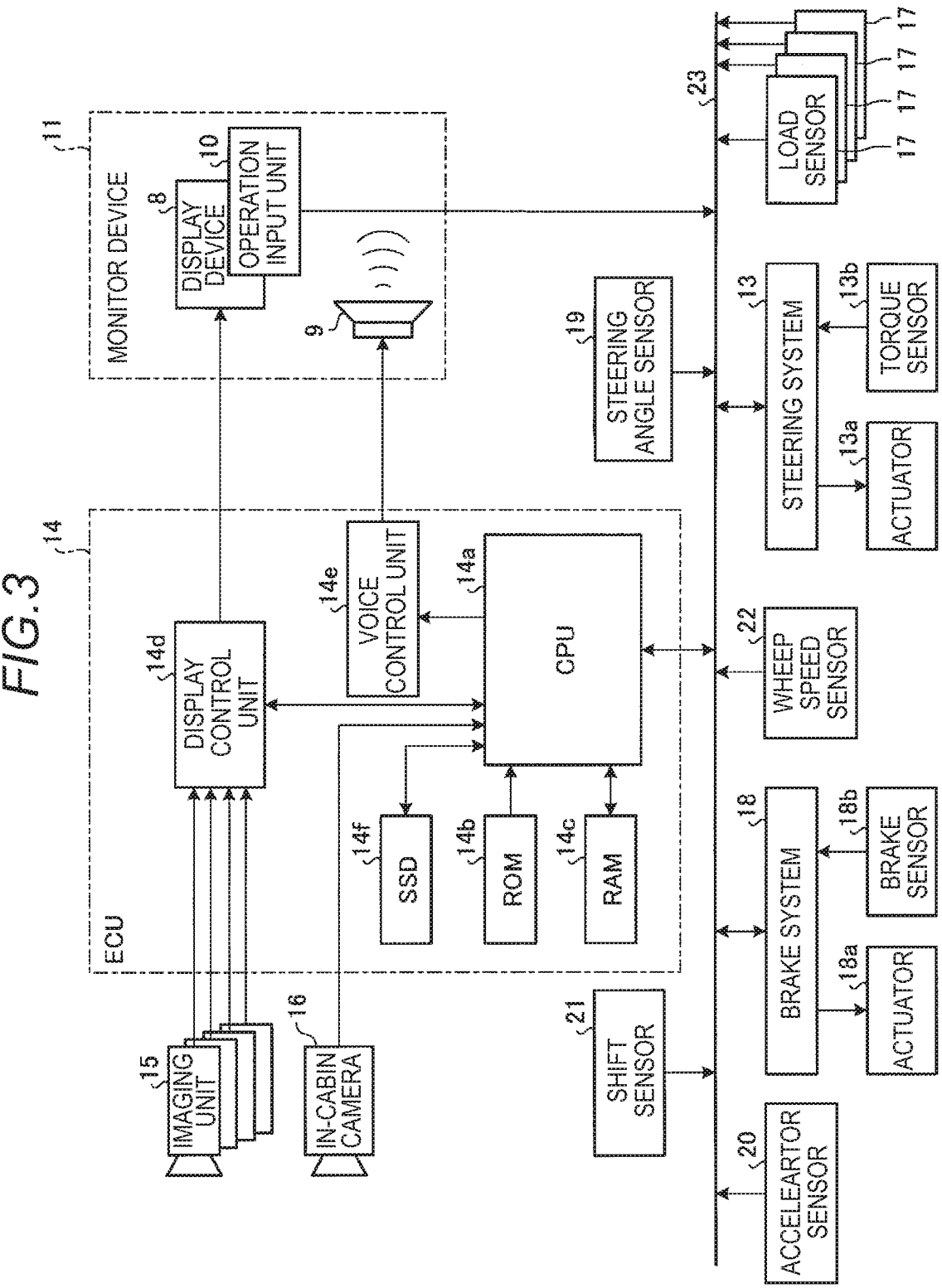
FIG. 3 is a block diagram illustrating an example of a functional configuration of the vehicle according to the first embodiment.

FIG. 3 is a block diagram illustrating an example of a functional configuration of the vehicle according to the first embodiment. As illustrated in FIG. 3, the vehicle 1 includes a steering system 13, a load sensor 17, a brake system 18, a steering angle sensor 19, an accelerator sensor 20, a shift sensor 21, a wheel speed sensor 22, an in-vehicle network 23, and an electronic control unit (ECU) 14. The monitor device 11, the steering system 13, the brake system 18, the steering angle sensor 19, the accelerator sensor 20, the shift sensor 21, the wheel speed sensor 22, and the ECU 14 are electrically connected via the in-vehicle network 23 which is an electric communication line. The in-vehicle network 23 is constituted by a controller area network (CAN) or the like.

The steering system 13 is an electric power steering system or a steer-by-wire (SBW) system. The steering system 13 includes an actuator 13a and a torque sensor 13b. Then, the steering system 13 is electrically controlled by the ECU 14 and the like to operate the actuator 13a and apply a torque to the steering unit 4 to supplement a steering force, thereby steering the wheel 3. The torque sensor 13b detects the torque that the driver gives to the steering unit 4 and transmits the detection result to the ECU 14.

The load sensor 17 is a sensor that is provided for each seat 2b (in the present embodiment, a driver's seat, a front passenger seat, or a rear seat) provided in the vehicle cabin 2a to detect the load applied to the seat 2b, and based on the detection result, detect the occupant in the vehicle 1. For example, based on the detection result of the load applied to the seat 2b, the load sensor 17 detects whether an occupant seated in the seat 2b is an adult or a child or that no occupant is seated in the seat 2b.

The brake system 18 includes an anti-lock brake system (ABS) that controls locking of a brake of the vehicle 1, an electronic stability control (ESC) that suppresses the side slipping of the vehicle 1 during cornering, an electric brake system that increases a braking force to assist the brake, and a brake by wire (BBW). The brake system 18 includes an actuator 18a and a brake sensor 18b. The brake system 18 is electrically controlled by the ECU 14 and the like to apply a braking force to the wheel 3 via the actuator 18a. The brake system 18 detects locking of the brake, idle rotation of the wheel 3, a sign of side slipping, and the like from the difference in the rotation of the left and right wheels 3 to execute control for prevention of the locking of the brake, the idle rotation of the wheel 3, and the side slipping. The brake sensor 18b is a displacement sensor that detects the position of a brake pedal as a movable element of the braking operation unit 6, and transmits the detection result of the position of the brake pedal to the ECU 14.

The steering angle sensor 19 is a sensor that detects the amount of steering of the steering unit 4 such as a steering wheel. In the present embodiment, the steering angle sensor 19 is constituted by a Hall element and the like, and detects the rotation angle of a rotating element of the steering unit 4 as the amount of steering and transmits the detection result to the ECU 14. The accelerator sensor 20 is a displacement sensor that detects the position of an accelerator pedal as a movable element of the acceleration operation unit 5 and transmits the detection result to the ECU 14.

The shift sensor 21 is a sensor that detects the position of a movable element (e.g., a bar, an arm, or a button) of the transmission operation unit 7 and transmits the detection result to the ECU 14. The wheel speed sensor 22 is a sensor that includes a hall element and the like, and detects the amount of rotation of the wheel 3 or the number of revolutions per unit time of the wheel 3 and transmits the detection result to the ECU 14.

The ECU 14 is constituted by a computer and the like, and controls the entire control of the vehicle 1 by cooperation of hardware and software. Specifically, the ECU 14 includes a central processing unit (CPU) 14a, a read only memory (ROM) 14b, a random access memory (RAM) 14c, a display control unit 14d, a voice control unit 14e, and a solid state drive (SSD) 14f. The CPU 14a, the ROM 14b, and the RAM 14c may be provided on the same circuit board.

The CPU 14a reads a program stored in a non-volatile storage device such as the ROM 14b and executes various arithmetic processings according to the program. For example, the CPU 14a executes an image processing on image data to be displayed on the display device 8, control of driving of the vehicle 1 along a target route to a target position such as a parking position, and a processing related to correction of the optical axis deviation of the imaging unit 15.

The ROM 14b stores various programs and parameters required for the execution of the programs. The RAM 14c temporarily stores various data used in the calculation in the CPU 14a. The display control unit 14d mainly executes an image processing on image data acquired from the imaging unit 15 to output the image data to the CPU 14a, conversion from the image data acquired from the CPU 14a to display image data to be displayed on the display device 8, and the like, among the arithmetic processings in the ECU 14. The voice control unit 14e mainly executes a processing of voice acquired from the CPU 14a and output to the voice output device 9 among the arithmetic processings in the ECU 14. The SSD 14f is a rewritable non-volatile storage unit, and continuously stores data acquired from the CPU 14a even when the ECU 14 is powered off.

Figure 4:
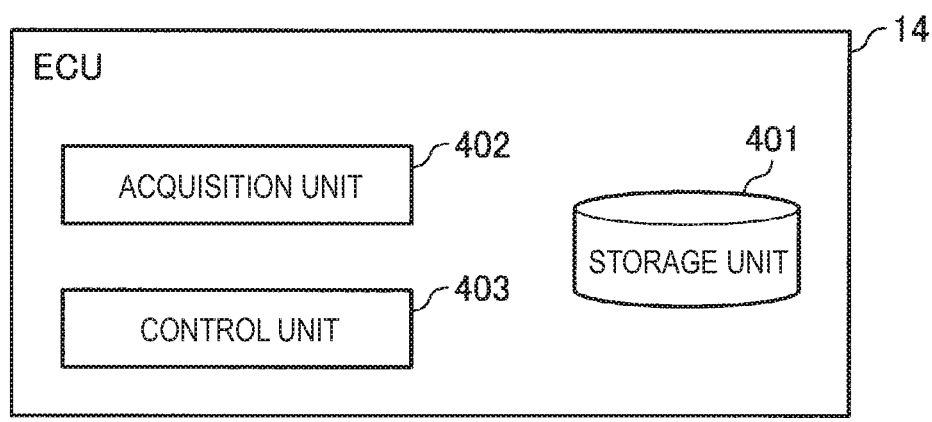
FIG. 4 is a block diagram illustrating an example of a functional configuration of an ECU of the vehicle according to the first embodiment.

FIG. 4 is a block diagram illustrating an example of a functional configuration of the ECU of the vehicle according to the first embodiment. As illustrated in FIG. 4, the ECU 14 includes a storage unit 401, an acquisition unit 402, and a control unit 403. For example, when a processor such as the CPU 14a mounted on a circuit board executes a camera calibration program stored in a storage medium such as the ROM 14b or the SSD 14f, the ECU 14 realizes the functions of the acquisition unit 402 and the control unit 403. A part or the entirety of the acquisition unit 402 and the control unit 403 may be constituted by hardware such as a circuit.

The storage unit 401 is realized by a storage medium such as the ROM 14b and functions as an example of a storage unit that stores a camera position posture table. The camera position posture table is a table that associates the allowable ranges (tolerance ranges) of a riding pattern (hereinafter referred to as a reference riding pattern) which is a reference for an occupant of the vehicle 1 with a camera position posture (hereinafter referred to as a reference position posture) of the imaging unit 15 which is a reference in the reference riding pattern. Here, the camera position posture includes at least one of the position and the angle (rotational angle) of the imaging unit 15.

The riding pattern of the present embodiment is information in which whether or not an occupant is seated in each seat 2b is combined for all seats 2b present in the vehicle 1. Further, a plurality of types of occupants who can be seated may be set for each seat 2b. The present embodiment describes an example in which the types of occupants are divided into an adult and a child. Then, the camera position posture table of the present embodiment stores the allowable range of the camera position posture corresponding to all riding patterns. Therefore, it becomes possible to determine whether or not the optical axis deviation of the imaging unit 15 has occurred regardless of a manner in which the occupant is seated in the vehicle 1.

In the present embodiment, the camera position posture table associates the reference riding pattern with the reference position posture of the imaging unit 15 which captures an image of the periphery of the vehicle 1, but the disclosure is not limited thereto as long as the reference riding pattern is associated with the reference position posture of the in-vehicle camera mounted in the vehicle 1. For example, when the imaging unit which performs notification or calibration of the optical axis deviation is the in-cabin camera 16, the camera position posture table associates the reference riding pattern with the reference position posture of the in-cabin camera 16.

Here, the reference position posture includes at least one of the position (hereinafter referred to as a reference position) and the angle (the rotation angle in the present embodiment, hereinafter referred to as a reference angle) which serve as a reference of the imaging unit 15. The reference position of the imaging unit 15 is a position serving as a reference of the imaging unit 15 alone. Specifically, the reference position is assumed that the position of the imaging unit 15 is indicated for each preset axis in a case where occupants get on in an arrangement indicated by the riding pattern on the basis of the position (as the origin) of the imaging unit 15 in a case where no occupant gets on the vehicle 1 and the optical axis deviation has not occurred. In the present embodiment, the reference position of the imaging unit 15 includes a reference position of the imaging unit 15 on the X-axis corresponding to the traveling direction of the vehicle 1, a reference position of the imaging unit 15 on the Z-axis corresponding to the vehicle width direction of the vehicle 1, and a reference position of the imaging unit 15 on the Y-axis corresponding to the height direction of the vehicle 1.

Further, the reference angle of the imaging unit 15 is an angle serving as a reference in a state where the imaging unit 15 is fixed. Specifically, the reference angle is assumed that the angle of the rotated imaging unit 15 is indicated for each preset axis in a case where occupants get on in an arrangement indicated by the riding pattern on the basis of the angle (as 0 degree) of the imaging unit 15 when no occupant gets on the vehicle 1 and the optical axis deviation has not occurred. In the present embodiment, the reference angle of the imaging unit 15 includes a rotation angle serving as a reference for the imaging unit 15 around the X-axis, a rotation angle serving as a reference for the imaging unit 15 around the Y-axis, and a rotation angle serving as a reference for the imaging unit 15 around the Z-axis.

Further, here, the allowable range is the range of deviation allowed for the camera position posture of the imaging unit 15 in the reference riding pattern. Specifically, the allowable range is the range of deviation that may occur in the camera position posture of the imaging unit 15 in the reference riding pattern due to a reason that is not secular change (e.g., a temporary factor associated with the occupant's riding situation or loading of baggage). In the present embodiment, the allowable range is the range of values allowable for each of the types of parameters (the reference position and the reference angle of the imaging unit 15) included in the reference position posture.

FIG. 5 is a view illustrating an example of a camera position posture table stored in the storage unit of the vehicle according to the first embodiment. In the present embodiment, as illustrated in FIG. 5, the camera position posture table is a table that associates a reference riding pattern, a reference position posture in the reference riding pattern, and an allowable deviation (tolerance) of the reference position posture with each other. In the camera position posture table illustrated in FIG. 5, the range of the tolerance on the basis of the reference position posture indicates the allowable range.

Here, the tolerance is deviation allowed for the camera position posture of the imaging unit 15 in the reference riding pattern. Specifically, the tolerance is deviation that may occur in the camera position posture of the imaging unit 15 in the reference riding pattern due to a reason (e.g., a temporary factor associated with the occupant's riding situation or loading of baggage) that is not secular change.

Here, as illustrated in FIG. 5, the reference riding pattern is a combination of the result of whether or not an occupant is seated in each seat 2*b* (driver's seat P1, front passenger seat P2, right rear seat P3, or left rear seat P4) and the result of whether an occupant sitting on each seat 2*b* is an adult or a child. In the reference riding pattern of the camera position posture table illustrated in FIG. 5, "○" indicates that an adult is seated in the seat 2*b*, "Δ" indicates that a child is seated in the seat 2*b*, and a blank indicates that no occupant is seated in the seat 2*b*.

Accordingly, for example, a reference riding pattern A is a riding pattern in which an adult gets in the driver's seat P1 and the passenger seat P2 and the rear seats P3 and P4 are empty. Further, a basic riding pattern B is a riding pattern in which an adult gets in the driver's seat P1, the passenger seat P2 is empty, a child gets in the rear seat P3, and the rear seat P4 is empty. Further, a basic riding pattern C is a riding pattern in which adults get in the driver's seat P1 and the passenger seat P2 and the rear seats P3 and P4 are empty.

The present embodiment describes an example in which the camera position posture table includes a basic riding pattern of a passenger car having four seats 2*b* including the driver's seat P1, the passenger seat P2, and the rear seats P3 and P4, but the disclosure is not limited thereto. For example, the camera position posture table may include a basic riding pattern of the vehicle 1 such as a passenger car or a bus having five or more seats 2*b*.

As illustrated in FIG. 5, the reference position posture includes the reference position and the reference angle of the imaging unit 15 for each reference riding pattern. The reference position includes an X-axis reference position, a Y-axis reference position, and a Z-axis reference position, as illustrated in FIG. 5. Here, the X-axis reference position is a position serving as a reference of the imaging unit 15 on the X-axis. The Y-axis reference position is a position serving as a reference of the imaging unit 15 on the Y-axis. The Z-axis reference position is a position serving as a reference of the imaging unit 15 on the Z-axis.

Further, the reference angle includes an X-axis reference angle, a Y-axis reference angle, and a Z-axis reference angle, as illustrated in FIG. 5. Here, the X-axis reference angle is a rotation angle serving as a reference of the imaging unit 15 around the X-axis. The Y-axis reference angle is a rotation angle serving as a reference of the imaging unit 15 around the Y-axis. The Z-axis reference angle is a rotation angle serving as a reference of the imaging unit 15 around the Z-axis.

The tolerance of the reference position posture includes a tolerance of the reference position and a tolerance of the reference angle, as illustrated in FIG. 5. The tolerance of the reference position includes an X-axis position tolerance, a Y-axis position tolerance, and a Z-axis position tolerance, as illustrated in FIG. 5. Here, the X-axis position tolerance is deviation (error) allowed for the X-axis reference position. The Y-axis position tolerance is deviation (error) allowed for the Y-axis reference position. The Z-axis position tolerance is deviation (error) allowed for the Z-axis reference position.

Further, the tolerance of the reference angle includes an X-axis angle tolerance, a Y-axis angle tolerance, and a Z-axis angle tolerance, as illustrated in FIG. 5. Here, the X-axis angle tolerance is deviation (error) allowed for the X-axis reference angle. The Y-axis angle tolerance is deviation (error) allowed for the Y-axis reference angle. The Z-axis angle tolerance is deviation (error) allowed for the Z-axis reference angle.

For example, according to the camera position posture table illustrated in FIG. 5, in the reference riding pattern A, the X-axis reference position is 2 mm and the X-axis position tolerance is ±4. Thus, the allowable range of the position of the imaging unit 15 in the X-axis direction in the reference riding pattern A is −2 mm to +6 mm. Further, according to the camera position posture table illustrated in FIG. 5, in the reference riding pattern A, the X-axis reference angle is 0 degree and the X-axis angle tolerance is ±1 degree. Thus, the allowable range of the angle of the imaging unit 15 around the X-axis in the reference riding pattern A is −1 degree to +1 degree.

Returning to FIG. 4, the acquisition unit 402 acquires the riding pattern and the camera position posture at a preset timing. Here, the preset timing is the timing of a preset cycle from the time when the ignition of the vehicle 1 is turned on to the time when the ignition is turned off. Further, the riding pattern is a pattern in which an occupant rides on the vehicle 1. In the present embodiment, the riding pattern is a combination of the result of whether or not an occupant is seated in each seat 2*b* and the result of whether an occupant seated in each seat 2*b* is an adult or a child. Further, the camera position posture includes the position of the imaging unit 15 and the angle of the imaging unit 15.

Here, the position of the imaging unit 15 is the position of the imaging unit 15. In the present embodiment, the position of the imaging unit 15 includes the position of the imaging unit 15 on the X-axis corresponding to the traveling direction of the vehicle 1, the position of the imaging unit 15 on the Z-axis corresponding to the vehicle width direction of the vehicle 1, and the position of the imaging unit 15 on the Y-axis corresponding to the height direction of the vehicle 1.

Further, the angle of the imaging unit 15 is an angle at which the imaging unit 15 is provided. In the present embodiment, the angle of the imaging unit 15 is a rotation angle in a state where the imaging unit 15 is fixed. Specifically, the angle of the imaging unit 15 includes a rotation angle of the imaging unit 15 around the X-axis, a rotation angle of the imaging unit 15 around the Y-axis, and a rotation angle of the imaging unit 15 around the Z-axis.

In the present embodiment, the acquisition unit 402 acquires the camera position posture based on a captured image obtained by capturing, by the imaging unit 15, an image of a target on which at least one of notification and correction (calibration) of the optical axis deviation is executed. For example, the acquisition unit 402 performs an image processing on a captured image obtained by capturing an image of the periphery of the vehicle 1 by the imaging unit 15 and detects a feature such as a white line or a crosswalk included in the captured image. Next, the acquisition unit 402 specifies the position of a vanishing point of parallel lines included in the acquired feature. Then, the acquisition unit 402 acquires the position and the angle of the imaging unit 15 as the camera position posture based on the deviation between the specified position of the vanishing point and a preset vanishing point position which is set in advance when the vehicle 1 is manufactured.

In the present embodiment, the acquisition unit 402 acquires both the position and the angle of the imaging unit 15 as the camera position posture, but may acquire at least one of the position and the angle of the imaging unit 15 as the camera position posture.

Further, in the present embodiment, the camera position posture of the imaging unit 15 is acquired in order to perform notification and calibration of the optical axis deviation of the imaging unit 15 which captures an image of the periphery of the vehicle 1, but the disclosure is not limited thereto as long as the camera position posture of an in-vehicle camera mounted in the vehicle 1 may be acquired. For example, in a case of performing notification or calibration of the optical axis deviation of the in-cabin camera 16 which captures an image of the inside of the vehicle cabin 2a, the acquisition unit 402 acquires the camera position posture of the in-cabin camera 16.

Further, in the present embodiment, the acquisition unit 402 acquires a riding pattern at a preset timing based on at least one of the result detected by the load sensor 17 provided in each seat 2b and the captured image obtained by the image capturing of the in-cabin camera 16. Therefore, it is possible to acquire a highly accurate riding pattern compared to a case where the riding pattern is estimated based on the acquired camera position posture. As a result, it is possible to appropriately execute notification and calibration of the optical axis deviation of the imaging unit 15 using the riding pattern and the camera position posture to be described later.

Here, the result detected by the load sensor 17 includes the result of whether an occupant seated in the seat 2b is an adult or a child or the result of whether or not an occupant is seated in the seat 2b.

Further, when acquiring a riding pattern based on a captured image obtained by capturing an image of the inside of the vehicle cabin 2a by the in-cabin camera 16, the acquisition unit 402 detects the seat 2b in which an occupant rides based on the position in the captured image at which the occupant is included. Next, the acquisition unit 402 acquires the volume of an occupant present in the detected seat 2b, and detects whether an occupant seated in the seat 2b is an adult or a child based on the acquired volume.

In the present embodiment, the acquisition unit 402 acquires the riding pattern using both the detection result by the load sensor 17 and the captured image obtained by the image capturing of the in-cabin camera 16, but the disclosure is not limited thereto. The riding pattern may be acquired using one of the detection result by the load sensor 17 and the captured image obtained by the image capturing of the in-cabin camera 16. Further, when the vehicle 1 has a vehicle height sensor capable of detecting the height of the vehicle body 2 from the ground, the acquisition unit 402 may acquire the riding pattern based on the detection result of the vehicle height sensor. Further, when the load sensor 17 is capable of detecting the weight of an occupant seated in the seat 2b, the acquisition unit 402 may acquire the result of whether an occupant seated in each seat 2b is an adult or a child or the result of whether or not an occupant is seated in each seat 2b based on the weight detected by the load sensor 17.

The control unit 403 determines whether or not the camera position posture acquired by the acquisition unit 402 is within the position posture allowable range associated with the reference riding pattern which matches the riding pattern acquired by the acquisition unit 402 in the camera position posture table stored in the storage unit 401. In the present embodiment, the control unit 403 specifies a reference position posture and a tolerance associated with the reference riding pattern which matches the acquired riding pattern in the camera position posture table. Then, the control unit 403 determines whether or not the acquired camera position posture is within the allowable range defined by the specified reference position posture and the specified tolerance.

At this time, the control unit 403 determines whether or not each of the position and the angle of the imaging unit 15 included in the acquired camera position posture is within the allowable range of the same type of reference position and reference angle included in the specified reference position posture. Specifically, the control unit 403 determines whether or not the position of the imaging unit 15 included in the acquired camera position posture is within the allowable range of the same type of reference position included in the specified reference position posture. Further, the control unit 403 determines whether or not the angle of the imaging unit 15 included in the acquired camera position posture is within the allowable range of the same type of reference angle included in the specified reference position posture.

In the present embodiment, the control unit 403 determines whether or not the acquired position of the imaging unit 15 on the X-axis is within an allowable range defined by the specified X-axis reference position and the specified X-axis position tolerance. The control unit 403 similarly determines whether or not the acquired positions of the imaging unit 15 on the Y-axis and on the Z-axis are within allowable ranges.

Further, in the present embodiment, the control unit 403 determines whether or not the acquired rotation angle of the imaging unit 15 around the X-axis is within an allowable range defined by the specified X-axis reference angle and the specified X-axis angle tolerance. The control unit 403 similarly determines whether or not the acquired rotation angles of the imaging unit 15 around the Y-axis and around the Z-axis are within allowable ranges.

Then, when the acquired camera position posture is within the allowable range, the control unit 403 determines that the acquired camera position posture is a temporary camera position posture associated with the occupant's riding situation on the vehicle 1 or loading of baggage. In this case, the control unit 403 does not perform notification of the optical axis deviation of the imaging unit 15 and calibration of correcting the optical axis deviation.

In the present embodiment, when all of the positions and the angles of the imaging unit 15 included in the acquired camera position posture are within the allowable ranges, the control unit 403 does not perform notification and calibration of the optical axis deviation of the imaging unit 15.

Meanwhile, when the acquired camera position posture is not within the allowable range, the control unit 403 determines that the acquired camera position posture is not the temporary camera position posture associated with the occupant's riding situation on the vehicle 1 or loading of baggage but is due to secular change of the imaging unit 15. In this case, the control unit 403 executes at least one of notification of the optical axis deviation of the imaging unit 15 and calibration of correcting the optical axis deviation.

In the present embodiment, when at least one of the position and the angle of the imaging unit 15 included in the acquired camera position posture is not within the allowable range, the control unit 403 executes at least one of notification and calibration of the optical axis deviation of the imaging unit 15.

Thus, since it is possible to determine whether the acquired camera position posture is the temporary camera position posture associated with the occupant's riding situation on the vehicle 1 or loading of baggage (i.e., whether the optical axis deviation of the imaging unit 15 has not occurred) or is due to secular change of the imaging unit 15 (i.e., whether the optical axis deviation of the imaging unit 15 has occurred), it is possible to appropriately execute notification and calibration of the optical axis deviation of the imaging unit 15.

Furthermore, the control unit 403 associates the riding pattern (hereinafter referred to as a registered riding pattern) acquired a preset number of times or more with the camera position posture (hereinafter referred to as a registered camera position posture) when the registered riding pattern is acquired, and stores the two in the storage unit 401. Then, when the acquired riding pattern matches the registered riding pattern stored in the storage unit 401, the control unit 403 determines whether or not the acquired camera position posture matches the registered camera position posture which is stored in the storage unit 401 in association with the registered riding pattern.

Next, when the acquired camera position posture does not match the registered camera position posture, the control unit 403 executes at least one of notification and calibration of the optical axis deviation of the imaging unit 15. Meanwhile, when the acquired camera position posture matches the registered camera position posture, the control unit 403 does not execute notification and calibration of the optical axis deviation of the imaging unit 15.

Thus, when the acquired camera position posture does not match the registered camera position posture, it is possible to determine that the acquired camera position posture is not the temporary camera position posture associated with the occupant's riding situation on the vehicle 1 or loading of baggage but is due to secular change of the imaging unit 15 and to immediately execute at least one of notification and calibration of the optical axis deviation of the imaging unit 15. As a result, it is possible to appropriately execute notification and calibration of the optical axis deviation of the imaging unit 15.

Figure 6:
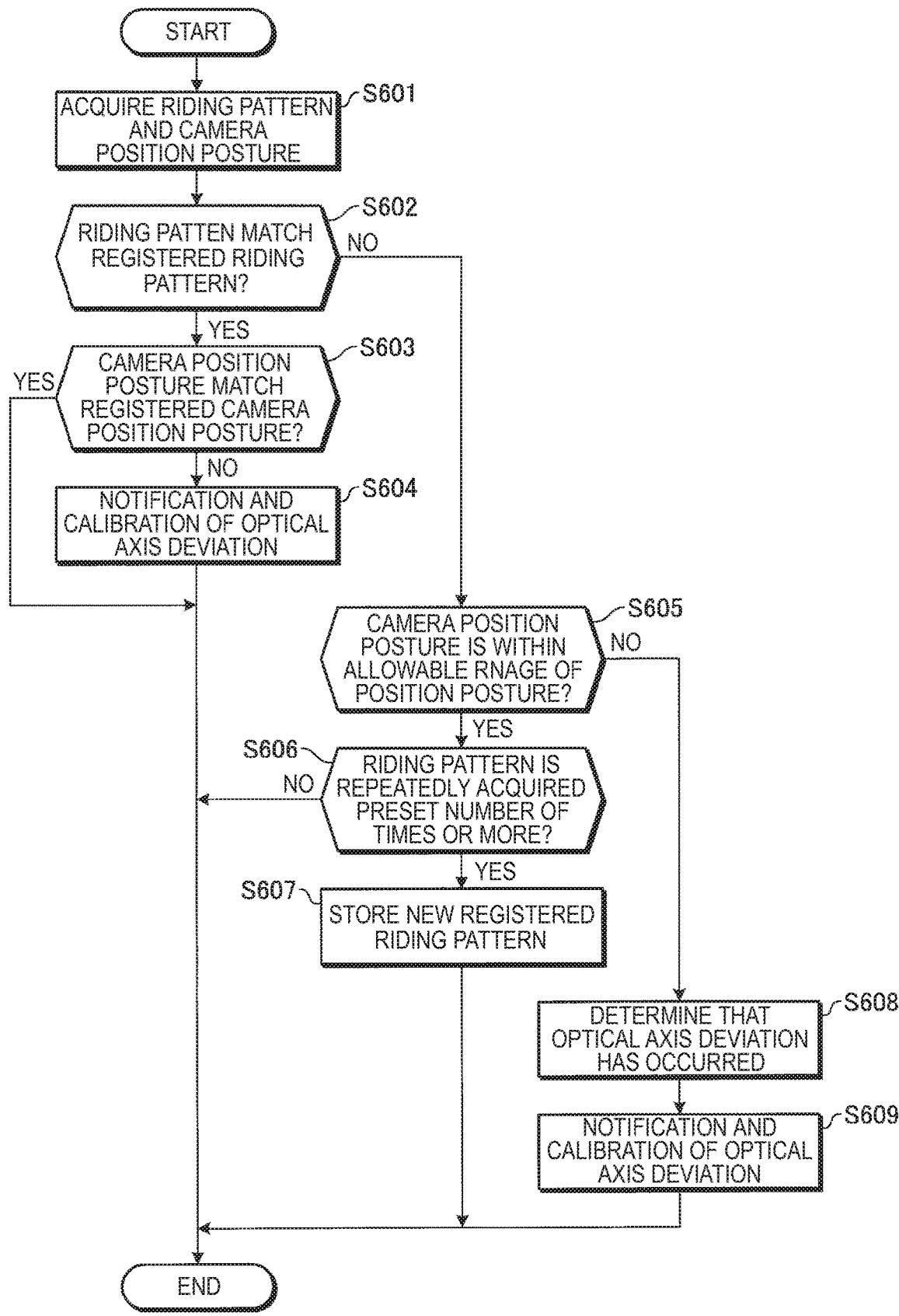
FIG. 6 is a flowchart illustrating an example of the flow of a processing of executing notification and calibration of the optical axis deviation of an imaging unit by the vehicle according to the first embodiment.

Next, an example of the flow of a processing of executing notification and calibration of the optical axis deviation of the imaging unit 15 by the vehicle 1 according to the first embodiment will be described with reference to FIG. 6. FIG. 6 is a flowchart illustrating an example of the flow of a processing of executing notification and calibration of the optical axis deviation of the imaging unit by the vehicle according to the first embodiment.

When the ignition of the vehicle 1 is turned on, the acquisition unit 402 acquires a riding pattern and a camera position posture at a preset cycle (step S601). Next, the control unit 403 determines whether or not the acquired riding pattern matches the registered riding pattern stored in the storage unit 401 (step S602).

When the acquired riding pattern matches the registered riding pattern (step S602: Yes), the control unit 403 determines whether or not the acquired camera position posture matches the registered camera position posture which is stored in the storage unit 401 in association with the registered riding pattern (step S603).

Next, when the acquired camera position posture matches the registered camera position posture (step S603: Yes), the control unit 403 determines that the acquired camera position posture is the temporary camera position posture associated with the occupant's riding situation on the vehicle 1 or loading of baggage (i.e., determines that the optical axis deviation of the imaging unit 15 has not occurred), and terminates the processing without executing calibration of correcting the optical axis deviation of the imaging unit 15.

Meanwhile, when the acquired camera position posture does not match the registered camera position posture (step S603: No), the control unit 403 determines that the acquired camera position posture is not the temporary camera position posture associated with the occupant's riding situation on the vehicle 1 or loading of baggage but is due to secular change of the imaging unit 15 (i.e., determines that the optical axis deviation of the imaging unit 15 has occurred), and executes calibration of correcting the optical axis deviation of the imaging unit 15 (step S604).

Returning to step S602, when the acquired riding pattern does not match the registered riding pattern (step S602: No), the control unit 403 determines whether or not the acquired camera position posture is within the allowable range associated with the reference riding pattern which matches the acquired riding pattern in the camera position posture table (step S605).

When it is determined that the acquired camera position posture is within the allowable range (step S605: Yes), the control unit 403 determines that the acquired camera position posture is the temporary camera position posture associated with the occupant's riding situation on the vehicle 1 or loading of baggage (i.e., determines that the optical axis deviation of the imaging unit 15 has not occurred). Next, the control unit 403 determines whether or not a riding pattern similar to the acquired riding pattern has been repeatedly acquired a preset number of times or more (step S606). Then, when the riding pattern similar to the acquired riding pattern is repeatedly acquired a preset number of times or more (step S606), the control unit 403 stores the acquired riding pattern as the registered riding pattern and the acquired camera position posture as the registered camera position posture in the storage unit 401 in association with each other (step S607).

Returning to step S605, when it is determined that the acquired camera position posture is not within the allowable range (step S605: No), the control unit 403 determines that the acquired camera position posture is due to secular change of the imaging unit 15 and determines that the optical axis deviation of the imaging unit 15 has occurred (step S608). Then, the control unit 403 executes at least one of notification of the optical axis deviation of the imaging unit 15 and calibration of correcting the optical axis deviation (step S609).

As described above, with the vehicle 1 according to the first embodiment, since it is possible to determine whether the acquired camera position posture is the temporary camera position posture associated with the occupant's riding situation on the vehicle 1 or loading of baggage (i.e., whether the optical axis deviation of the imaging unit 15 has not occurred) or is due to secular change of the imaging unit 15 (i.e., whether the optical axis deviation of the imaging unit 15 has occurred), it is possible to appropriately execute notification and calibration of the optical axis deviation of the imaging unit 15. Further, with the vehicle 1 according to the first embodiment, in the camera position posture table, since each riding pattern is associated with the tolerance (allowable range) for each position of the imaging unit 15 for each preset axis and the tolerance (allowable range) of each angle of the imaging unit 15 for each preset axis so that the tolerance (allowable range) may be set in consideration of the difference in the physique or weight of the occupant, it is possible to improve the detection accuracy of the optical axis deviation.

Second Embodiment

The present embodiment is an example in which, when the acquired camera position posture is not within the allowable range included in the camera position posture table, at least one of notification of the optical axis deviation of the imaging unit and correction of the optical axis deviation is executed. In the following description, a description of the same configuration as that of the first embodiment is omitted.

In the present embodiment, when the vehicle 1 does not have a sensor capable of detecting a riding pattern such as the load sensor 17 or the in-cabin camera 16, the control unit 403 determines whether or not the acquired camera position posture is within any one allowable range of the camera position posture table. Then, when the acquired camera position posture is within any one allowable range, the control unit 403 determines that the acquired camera position posture is the temporary camera position posture associated with the occupant's riding situation on the vehicle 1 or loading of baggage (i.e., determines that the optical axis deviation of the imaging unit 15 has not occurred). In this case, the control unit 403 does not perform notification of the optical axis deviation of the imaging unit 15 and calibration of correcting the optical axis deviation.

Meanwhile, when the acquired camera position posture is not within any one allowable range included in the camera position posture table, the control unit 403 determines that the acquired camera position posture is not the temporary camera position posture associated with the occupant's riding situation on the vehicle 1 or loading of baggage but is due to secular change of the imaging unit 15 (i.e., determines that the optical axis deviation of the imaging unit 15 has occurred). In this case, the control unit 403 executes at least one of notification of the optical axis deviation of the imaging unit 15 and calibration of correcting the optical axis deviation.

Thus, even when the vehicle 1 does not have a sensor capable of detecting a riding pattern such as the load sensor 17 or the in-cabin camera 16, it is possible to avoid erroneous determination of whether the acquired camera position posture is the temporary camera position posture associated with the occupant's riding situation on the vehicle 1 or loading of baggage (i.e., whether the optical axis deviation of the imaging unit 15 has occurred) or is due to secular change of the imaging unit 15 (i.e., whether the optical axis deviation of the imaging unit 15 has occurred).

Figure 7:
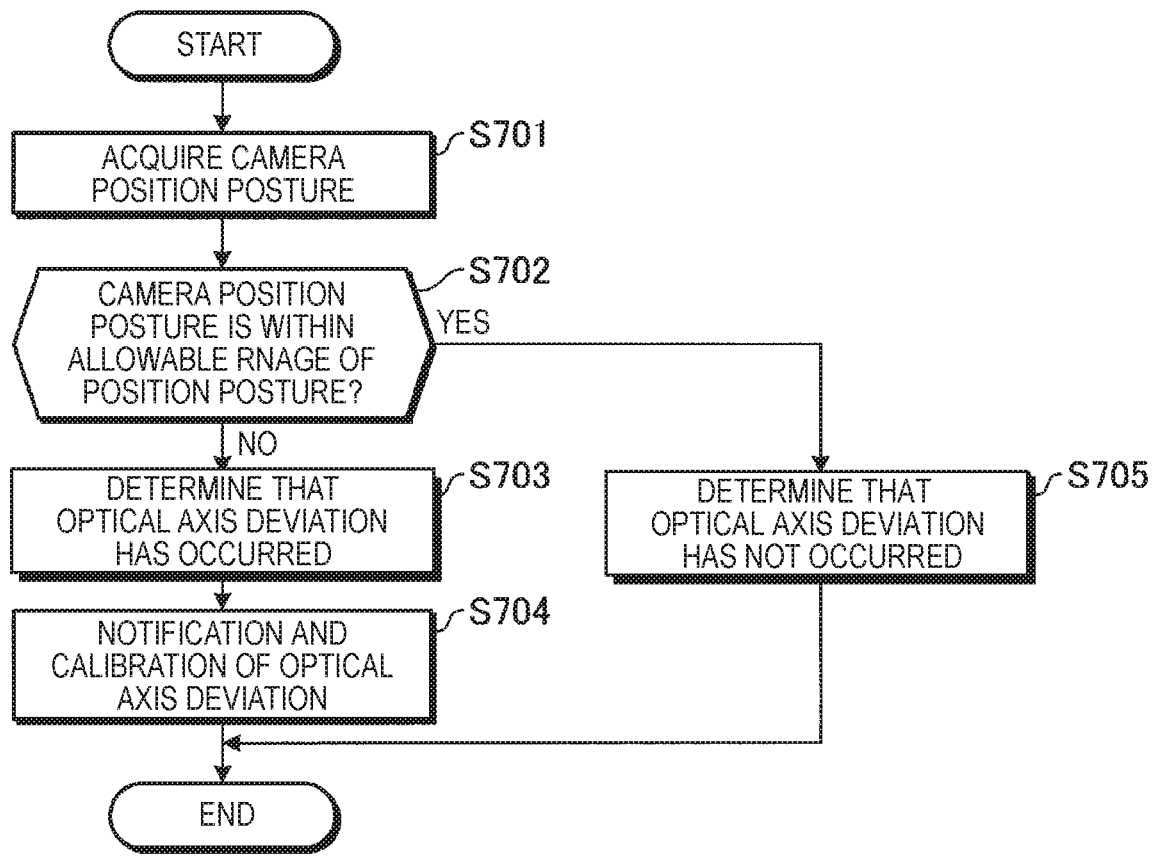
FIG. 7 is a flowchart illustrating an example of the flow of a processing of executing notification and calibration of the optical axis deviation of the imaging unit by the vehicle according to a second embodiment.

Next, an example of the flow of a processing of executing notification and calibration of the optical axis deviation of the imaging unit 15 by the vehicle 1 according to the present embodiment will be described with reference to FIG. 7. FIG. 7 is a flow chart illustrating an example of the flow of a processing of executing notification and calibration of the optical axis deviation of the imaging unit by the vehicle according to a second embodiment.

When the ignition of the vehicle 1 is turned on, the acquisition unit 402 acquires a camera position posture at a preset cycle (step S701).

Next, the control unit 403 determines whether or not the acquired camera position posture is within any one allowable range included in the camera position posture table (step S702). Then, when the acquired camera position posture is not within any one allowable range (step S702: No), the control unit 403 determines that the acquired camera position posture is due to secular change of the imaging unit 15, and determines that the optical axis deviation of the imaging unit 15 has occurred (step S703). Then, the control unit 403 executes at least one of notification of the optical axis deviation of the imaging unit 15 and calibration of correcting the optical axis deviation (step S704).

Meanwhile, when the acquired camera position posture is within any one allowable range (step S702: Yes), the control unit 403 determines that the acquired camera position posture is the temporary camera position posture associated with the occupant's riding situation on the vehicle 1 or loading of baggage, and determines that the optical axis deviation of the imaging unit 15 has not occurred (step S705). In this case, the control unit 403 does not execute notification of the optical axis deviation of the imaging unit 15 and calibration of correcting the optical axis deviation.

As described above, with the vehicle 1 according to the second embodiment, even when the vehicle 1 does not have a sensor capable of detecting a riding pattern such as the load sensor 17 or the in-cabin camera 16, it is possible to determine whether the acquired camera position posture is the temporary camera position posture associated with the occupant's riding situation on the vehicle 1 or loading of baggage or is due to secular change of the imaging unit 15.

A camera calibration device according to an aspect of this disclosure includes, as an example, a storage unit configured to store an allowable range of a camera position posture including at least one of a position and an angle of an in-vehicle camera in association with a reference riding pattern that is a reference of an occupant's riding pattern with respect to a vehicle, an acquisition unit configured to acquire the riding pattern and the camera position posture at a preset timing, and a control unit configured to execute at least one of notification of optical axis deviation of the in-vehicle camera and correction of the optical axis deviation when the acquired camera position posture is not within the allowable range associated with the reference riding pattern that matches the acquired riding pattern in the storage unit. Thus, as an example, since it is possible to determine whether the acquired camera position posture is a temporary camera position posture associated with an occupant's riding situation on the vehicle or loading of baggage or is due to secular change of an imaging unit, it is possible to appropriately execute notification and calibration of the optical axis deviation of the imaging unit.

In the camera calibration device according to the aspect of this disclosure, as an example, the acquisition unit may acquire the riding pattern based on a detection result of a sensor that detects an occupant in the vehicle. Thus, as an example, since it is possible to acquire the riding pattern with high accuracy compared to a case of estimating the riding pattern based on the acquired camera position posture, it is possible to appropriately execute notification and calibration of the optical axis deviation of the imaging unit using the riding pattern and the camera position posture.

In the camera calibration device according to the aspect of this disclosure, as an example, the storage unit may further store a registered riding pattern that is the riding pattern acquired at a preset number of times or more and a registered camera position posture that is the camera position posture in the registered riding pattern in association with each other, and the control unit may correct the optical axis deviation when the acquired camera position posture does not match the registered camera position posture associated with the registered riding pattern that matches the acquired riding pattern in the storage unit. Thus, as an example, when the acquired camera position posture does not match the registered camera position posture, it is possible to determine that the acquired camera position posture is not the temporary camera position posture associated with the occupant's riding situation on the vehicle or loading of baggage but is due to secular change of the imaging unit and to immediately execute at least one of notification and calibration of the optical axis deviation of the imaging unit. Therefore, it is possible to appropriately execute notification and calibration of the optical axis deviation of the imaging unit.

A camera calibration device according to another aspect of this disclosure includes, as an example, a storage unit configured to store an allowable range of a camera position posture including at least one of a position and an angle of an in-vehicle camera that occurs according to arrangement of an occupant in a vehicle, an acquisition unit configured to acquire the camera position posture at a preset timing, and a control unit configured to execute at least one of notification of optical axis deviation of the in-vehicle camera and correction of the optical axis deviation when the acquired camera position posture is not within the allowable range stored in the storage unit. Thus, as an example, even when the vehicle has no sensor capable of detecting the riding pattern, it is possible to determine whether the acquired camera position posture is the temporary camera position posture associated with the occupant's riding situation on the vehicle or loading of baggage or is due to secular change of the imaging unit.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A camera calibration device comprising:
    a storage unit configured to store an allowable range of a camera position posture including at least one of a position and an angle of an in-vehicle camera in association with a reference riding pattern that is a reference of an occupant's riding pattern with respect to a vehicle;
    an acquisition unit configured to acquire the riding pattern and the camera position posture at a preset timing; and
    a control unit configured to execute at least one of notification of optical axis deviation of the in-vehicle camera and correction of the optical axis deviation when the acquired camera position posture is not within the allowable range associated with the reference riding pattern that matches the acquired riding pattern in the storage unit.

2. The camera calibration device according to claim 1, wherein
    the acquisition unit acquires the riding pattern based on a detection result of a sensor that detects an occupant in the vehicle.

3. The camera calibration device according to claim 1, wherein
    the storage unit further stores a registered riding pattern that is the riding pattern acquired at a preset number of times or more and a registered camera position posture that is the camera position posture in the registered riding pattern in association with each other, and
    the control unit corrects the optical axis deviation when the acquired camera position posture does not match the registered camera position posture associated with the registered riding pattern that matches the acquired riding pattern in the storage unit.

4. A camera calibration device comprising:
    a storage unit configured to store an allowable range of a camera position posture including at least one of a position and an angle of an in-vehicle camera that occurs according to arrangement of an occupant in a vehicle;
    an acquisition unit configured to acquire the camera position posture at a preset timing; and
    a control unit configured to execute at least one of notification of optical axis deviation of the in-vehicle camera and correction of the optical axis deviation when the acquired camera position posture is not within the allowable range stored in the storage unit.

* * * * *